United States Patent
Kubo et al.

(10) Patent No.: US 8,014,452 B2
(45) Date of Patent: Sep. 6, 2011

(54) FORMAT CONVERSION CIRCUIT

(75) Inventors: Hiroaki Kubo, Ohmihachiman (JP); Masahiro Murakami, Yamashina-Kyoto (JP)

(73) Assignee: International Business Machines Corporation, Armonk, NY (US)

( * ) Notice: Subject to any disclaimer, the term of this patent is extended or adjusted under 35 U.S.C. 154(b) by 2473 days.

(21) Appl. No.: 10/716,791

(22) Filed: Nov. 19, 2003

(65) Prior Publication Data

US 2004/0165666 A1    Aug. 26, 2004

(30) Foreign Application Priority Data

Nov. 26, 2002    (JP) .................. 2002-342268

(51) Int. Cl.
*H04N 5/04* (2006.01)
*H04N 5/05* (2006.01)
*H04N 5/10* (2006.01)
*H04N 21/8547* (2011.01)
*H04N 7/01* (2006.01)
*H04M 1/00* (2006.01)
*H04N 7/26* (2006.01)

(52) U.S. Cl. ............. 375/240.26; 375/240; 375/240.01; 386/330

(58) Field of Classification Search ............. 375/240.16; 386/95, 131, 85, 88, 90, 91
See application file for complete search history.

(56) References Cited

U.S. PATENT DOCUMENTS

| | | | | |
|---|---|---|---|---|
| 4,237,553 A | * | 12/1980 | Larsen | 370/389 |
| 5,671,260 A | * | 9/1997 | Yamauchi et al. | 375/372 |
| 5,812,760 A | * | 9/1998 | Mendenhall et al. | 714/49 |
| 5,831,690 A | * | 11/1998 | Lyons et al. | 375/240.28 |
| 6,233,253 B1 | * | 5/2001 | Settle et al. | 370/474 |
| 6,297,794 B1 | * | 10/2001 | Tsubouchi et al. | 345/204 |
| 6,377,309 B1 | * | 4/2002 | Ito et al. | 348/554 |
| 6,400,767 B1 | * | 6/2002 | Nuber et al. | 375/240.26 |
| 6,553,147 B2 | * | 4/2003 | Chai et al. | 382/240 |
| 7,027,515 B2 | * | 4/2006 | Lin | 375/240.25 |
| 2001/0050924 A1 | * | 12/2001 | Herrmann et al. | 370/493 |
| 2002/0085632 A1 | * | 7/2002 | Choi et al. | 375/240.01 |

(Continued)

FOREIGN PATENT DOCUMENTS

JP    09-322148    12/1997

(Continued)

OTHER PUBLICATIONS

Watkinson, J. __MPEG__. Oxford, Focal Press, 2004. pp. 357-358.*

(Continued)

*Primary Examiner* — David Czekaj
*Assistant Examiner* — David N Werner
(74) *Attorney, Agent, or Firm* — Derek S. Jennings; Anne Vachon Dougherty (57) ABSTRACT

A format conversion circuit 100 includes a FIFO memory 101 for writing and reading video data VD in synchronization with a sampling clock CK, a header generation circuit 102 for generating an MPEG2-TS packet header, and a synchronous timing detection circuit 103 for detecting a horizontal synchronizing signal for the video data VD. The format conversion circuit 100 also includes a counter 104 which counts the number of bytes of packet header and the number of bytes of video data VD, and a switch 105 which selects the packet header until the counted number of bytes reaches four bytes, and then selects the video data read out of the FIFO memory 101.

2 Claims, 11 Drawing Sheets

U.S. PATENT DOCUMENTS

| | | | |
|---|---|---|---|
| 2002/0136241 A1* | 9/2002 | Pasqualino et al. | 370/493 |
| 2003/0031261 A1* | 2/2003 | Valente et al. | 375/240.27 |
| 2004/0027491 A1* | 2/2004 | Hosoi | 348/661 |

FOREIGN PATENT DOCUMENTS

| | | |
|---|---|---|
| JP | 10-116064 | 5/1998 |
| JP | 10-198632 | 7/1998 |
| JP | 2000-165445 | 6/2000 |
| JP | 2001-251266 | 9/2001 |
| WO | WO 98/43423 | 10/1998 |

OTHER PUBLICATIONS

ISO/IEC International Standard 13818-1:2000(E). ISO, 2000. pp. xi-xiii, 18-30, 125.*

* cited by examiner

FORMAT CONVERSION CIRCUIT

TECHNICAL FIELD

This invention relates to a format conversion circuit, and more particularly, to a format conversion circuit for converting the video data format to a pseudo format of MPEG-2 (Moving Picture Experts Group phase 2) TS (Transport Stream).

DESCRIPTION OF THE PRIOR ART

Figure 11:
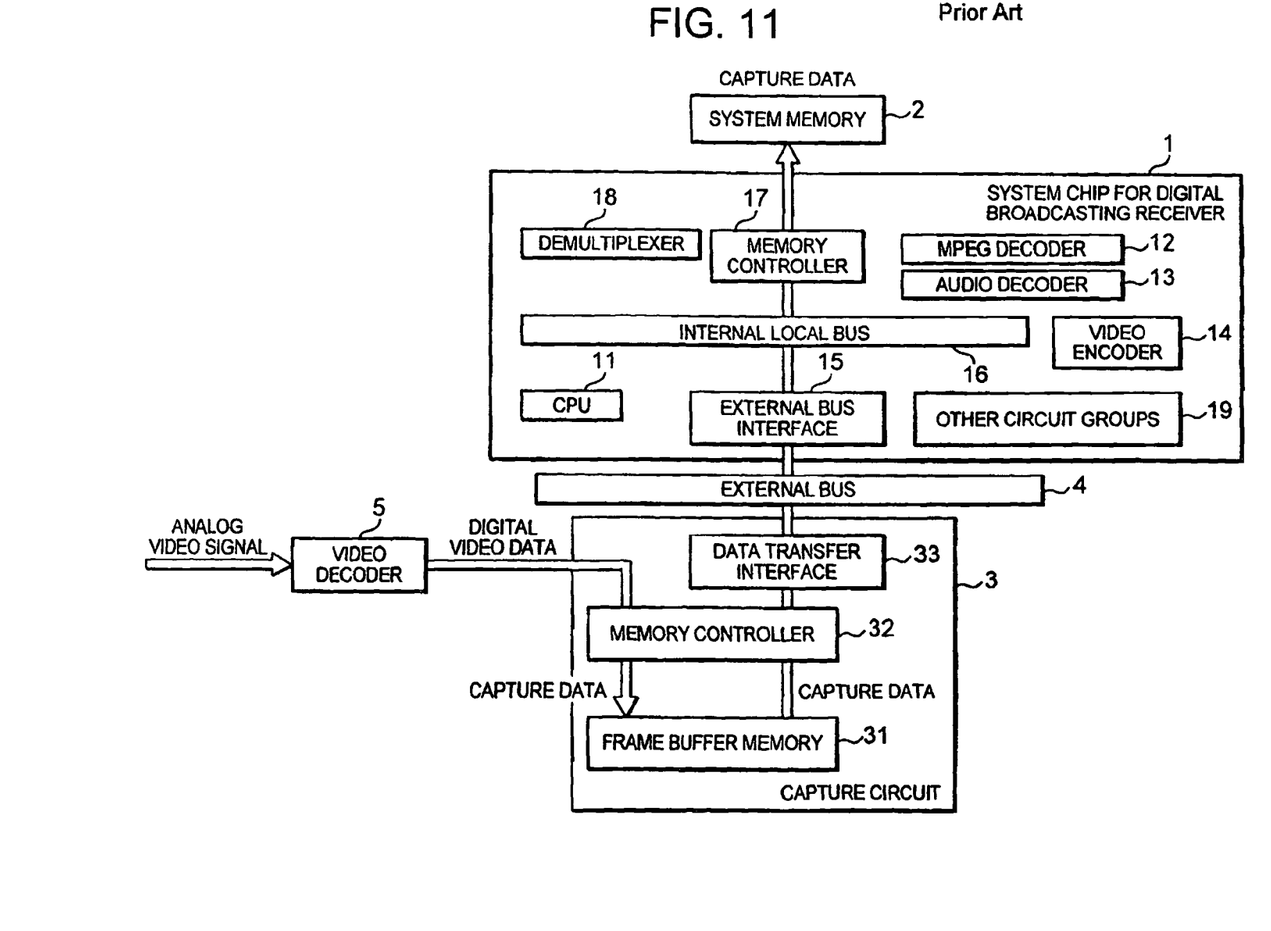
FIG. 11 It is a functional block diagram showing the general structure of a conventional video data capture system.

FIG. 11 is a functional block diagram showing the general structure of a conventional video data capture system. Adding a capture circuit 3 to an existing system chip 1 for digital broadcast receivers allows this video data capture system to capture an analog video signal and transfer the captured video data to a system memory.

As shown in FIG. 11, a currently provided system chip 1 for digital broadcast receivers includes a CPU (Central Processing Unit) 11, an MPEG decoder 12, an audio decoder 13, a video encoder 14, an external bus interface 15, an internal local bus 16, a memory controller 17, a demultiplexer 18, and other circuit groups 19.

In order to use the system chip 1 for digital broadcast receivers to capture an analog video signal in the NTSC (National Television system Committee) or PAL (Phase Alternating Line) format and transfer the same to the system memory 2, the capture circuit 3 needs to be added outside the system chip 1 for digital broadcast receivers.

The capture circuit 3 includes a frame buffer memory 31 for storing a frame of video data, and a memory controller 32 for controlling the writing and reading of data to and from the frame buffer memory 31. The capture circuit 3 also includes a data transfer interface 33 for transferring the frame of video data read out of the frame buffer memory 31 to the digital broadcast receiver system chip 1 through an external bus 4.

The analog video signal is converted by a video decoder 5 to digital video data in ITUR-BT.656 or 601 format, and input into the capture circuit 3. The capture circuit 3 stores the input video data, and transfers the stored data to the digital broadcast receiver system chip 1 on a frame-by-frame basis. In the digital broadcast receiver system chip 1, the video data transferred through the external bus 4 is then transferred to the internal local bus 16 through the external bus interface 15. The memory controller 17 writes the video data transferred to the internal local bus 16 to the system memory 2.

Although the capture circuit 3 can be incorporated in the digital broadcast receiver system chip 1, this incorporation increases not only the number of pins for the video data interface, but also the overall circuit size, resulting in an increase in the cost of the digital broadcast receiver system chip 1.

[Patent Document 1]
Japanese Patent Laid-Open No. 10-116064.
(Published May 6, 1998)
[Patent Document 2]
Japanese Patent Laid-Open No. 9-322148.
(Published Dec. 12, 1997)
[Patent Document 3]
Japanese Patent Laid-Open No. 10-198632.
(Published Jul. 31, 1998)

SUMMARY OF THE INVENTION

It is an object of the invention to provide a format conversion circuit capable of capturing video data given from the outside using an existing system chip for digital broadcast receivers as it is without adding any capture circuit.

A format conversion circuit according to the invention includes storage means, header generation means, synchronous timing detection means, and selection means. The storage means stores video data. The header generation means generates a packet header that adheres to a standard for motion picture compression. The synchronous timing detection means detects a synchronizing signal for the video data. The selection means repeats the selection of the packet header generated by the header generation means and the selection of a predetermined amount of video data read out of the storage means as a payload responsive to the packet header, during an interval from when the synchronous timing detection means detects the synchronizing signal until it detects the next synchronizing signal.

In the format conversion circuit, the video data is divided by the selection means into predetermined amounts of video data, and the packet header is inserted between the divided video data according to the standard for motion picture compression. Thus the format of the video data is converted to a pseudo format of the motion picture compression standard. When the format-converted video data is input to a system chip for digital broadcast receivers through an input port that adheres to the motion picture compression standard, the system chip processes the video data in the same manner as it processes normal data. As a result, the captured video data can be transferred to a system memory. Further, since the video data is divided and output as it is, the format conversion is performed in real time. In addition, multiple combinations of packet headers and payloads are output during an interval from a synchronizing signal and the next synchronizing signal, so that the delays of processing the video data due to the insertion of packet headers are absorbed during the synchronization period.

The selection means preferably includes a counter and a switch. The counter is reset in response to the synchronizing signal detected by the synchronous timing detection means to count the amount of packet header output from the header generation means and the amount of video data read out of the storage means. The switch selects the packet header generated by the header generation means until the amount of packet header counted by the counter reaches a predetermined amount, and selects the video data read out of the storage means after the amount of packet header counted by the counter has reached the predetermined amount.

As mentioned above, the format conversion circuit according to the invention is capable of capturing video data given from the outside using an existing system chip for digital broadcast receivers as it is without adding any capture circuit.

DETAILED DESCRIPTION OF THE INVENTION

Referring to the accompanying drawings, an embodiment of the invention will now be described in detail. In the drawings, identical or equivalent portions are given the same reference numerals to invoke the same descriptions.

Figure 1:
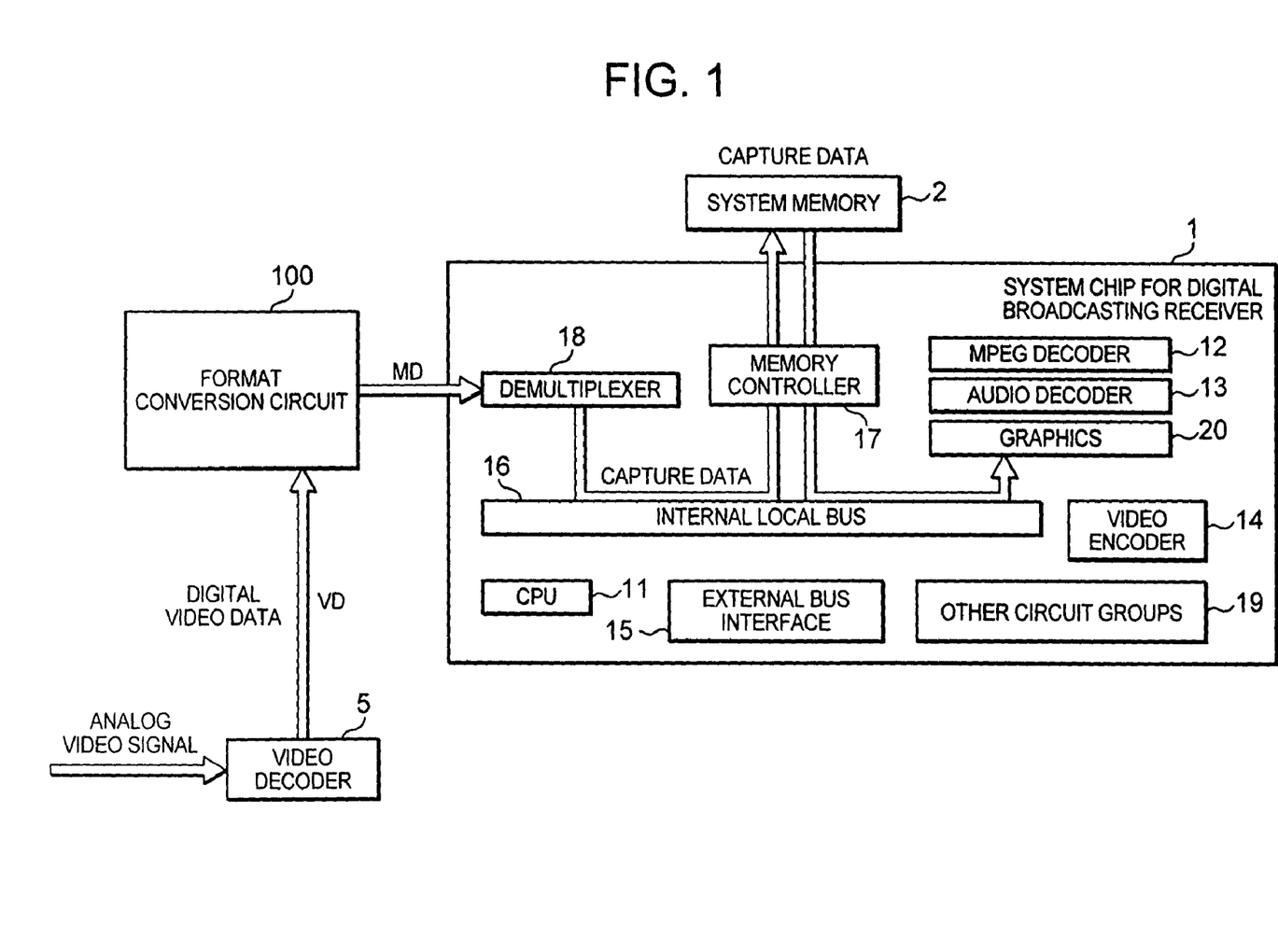
FIG. 1 It is a functional block diagram showing the general structure of a video capture system including a format conversion circuit according to an embodiment of the invention.

FIG. 1 is a functional block diagram showing the general structure of a video data capture system including a format conversion circuit 100 according to the embodiment of the invention. As shown in FIG. 1, the format conversion circuit 100 is added to this video data capture system instead of the capture circuit 3 shown in FIG. 11. The format conversion circuit 100 converts the format of digital video data VD, output from the video decoder 5, to a pseudo MPEG2-TS format. The video data the format of which has been converted to the pseudo MPEG2-TS format (hereinbelow called "MPEG2-TS data" MD) is supplied to the demultiplexer 18 through an MPEG2-TS input port of the system chip 1 for digital broadcast receivers. The demultiplexer 18 is a circuit for processing MPEG2-TS data packets. The demultiplexer 18 and the MPEG2-TS input port reside on any existing system chip 1 for digital broadcast receivers.

Here, for example, in the ITUR-BT.656 format, the digital video data VD is eight bits long and contains control signals such as horizontal and vertical synchronizing signals. However, the format of the digital video data VD is not limited to ITUR-BT.656, and it may be in TUR-BT.601 format.

After the format conversion circuit 100 converts the format to the pseudo MPEG2-TS format and inputs the MPEG2-TS data MD to the demultiplexer 18, the demultiplexer 18 processes the input MPEG2-TS data MD in the same manner as it processes real data as defined by MPEG2-TS. As a result, the input MPEG2-TS data MD can be transferred to the system memory 2 through the internal local bus 16 and memory controller 17. The system memory 2 has a work area for the CPU 11 and a work area related to the decoders 12, 13, and graphics 20. Grabbing into the system memory 2 the video data thus captured allows the graphics 20 to perform graphic processing.

The functions of the demultiplexer 18 residing on the existing system chip 1 for digital broadcast receivers will be described before a detailed description of the format conversion circuit 100.

Figure 2:
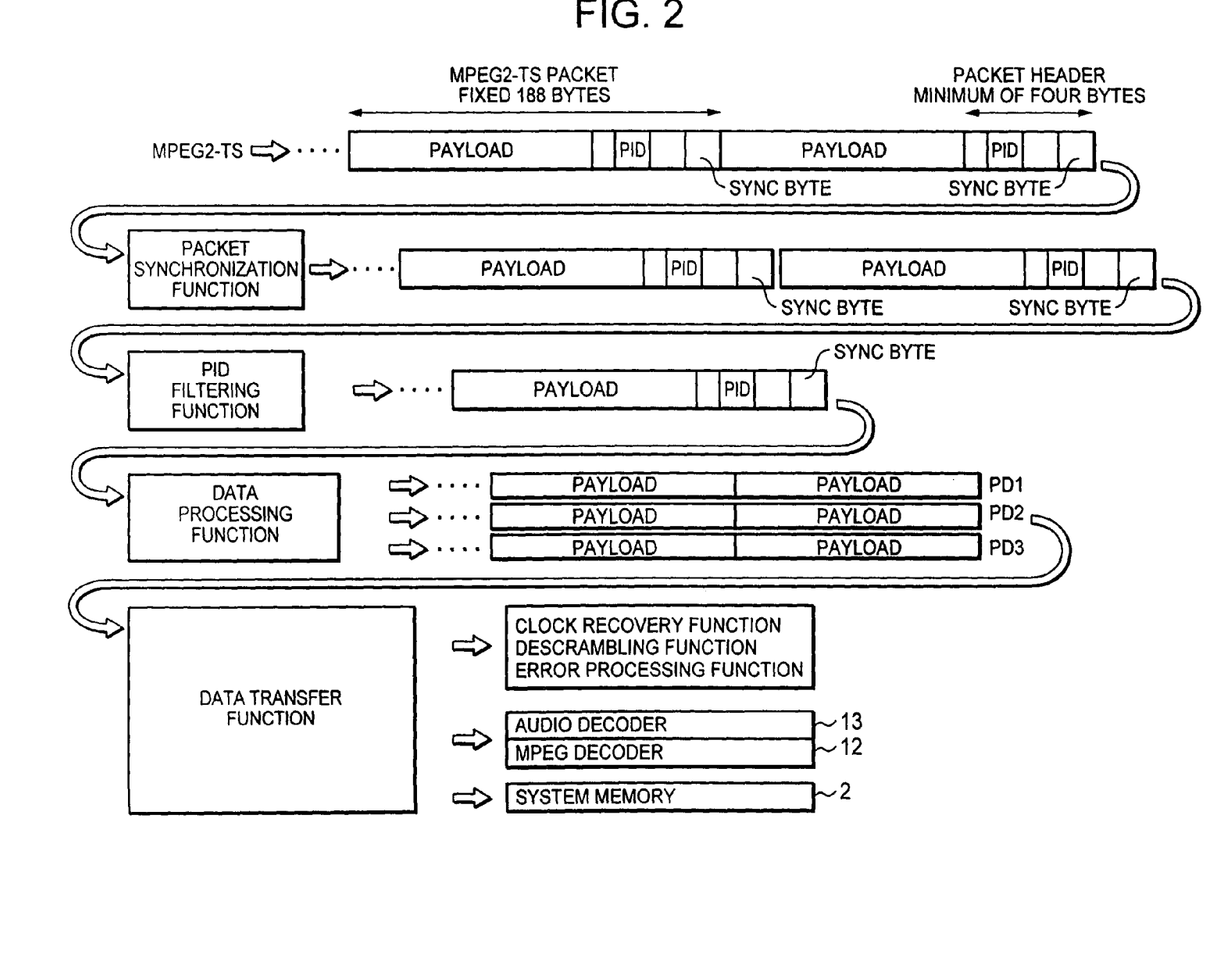
FIG. 2 It is a diagram for explaining a method of processing MPEG2-TS data through a demultiplexer in a system chip for digital broadcast receivers shown in FIG. 1.

As shown in FIG. 2, the demultiplexer 18 generally has the following seven functions: (1) packet synchronization function, (2) PID (Packet Identification) filtering function, (3) clock recovery function, (4) descrambling function, (5) error processing function, (6) data processing function (PES (Packetized Elementary Stream) or ES packet assembly), and (7) data transfer function. Each MPEG2-TS data packet has a fixed length of 188 bytes, and consists of a minimum of four bytes of packet header, and a payload containing information as a data body. The packet header includes a sync byte representing the top of the packet, a PID representing attributes of each individual stream of packet data, etc.

The demultiplexer 18 uses its packet synchronization function to detect the synch byte and divide the continuous MPEG2-TS data MD into 188-byte data packets. The demultiplexer 18 then uses its PID filtering function to refer to the PID and extract necessary data packets. Then the demultiplexer 18 uses its data processing function to assemble the extracted data packets in a required form and manage them on a PID basis. Then the demultiplexer 18 uses its data transfer function to transfer data related to clock recovery to its clock recovery function, data related to descrambling to its data descrambling function, data related to error processing to its error processing function, video data to the MPEG decoder 12, audio data to the audio decoder 13, and the other data to the system memory 2. The other functions are performed as necessary to process and transfer data in the system memory 2.

Figure 3:
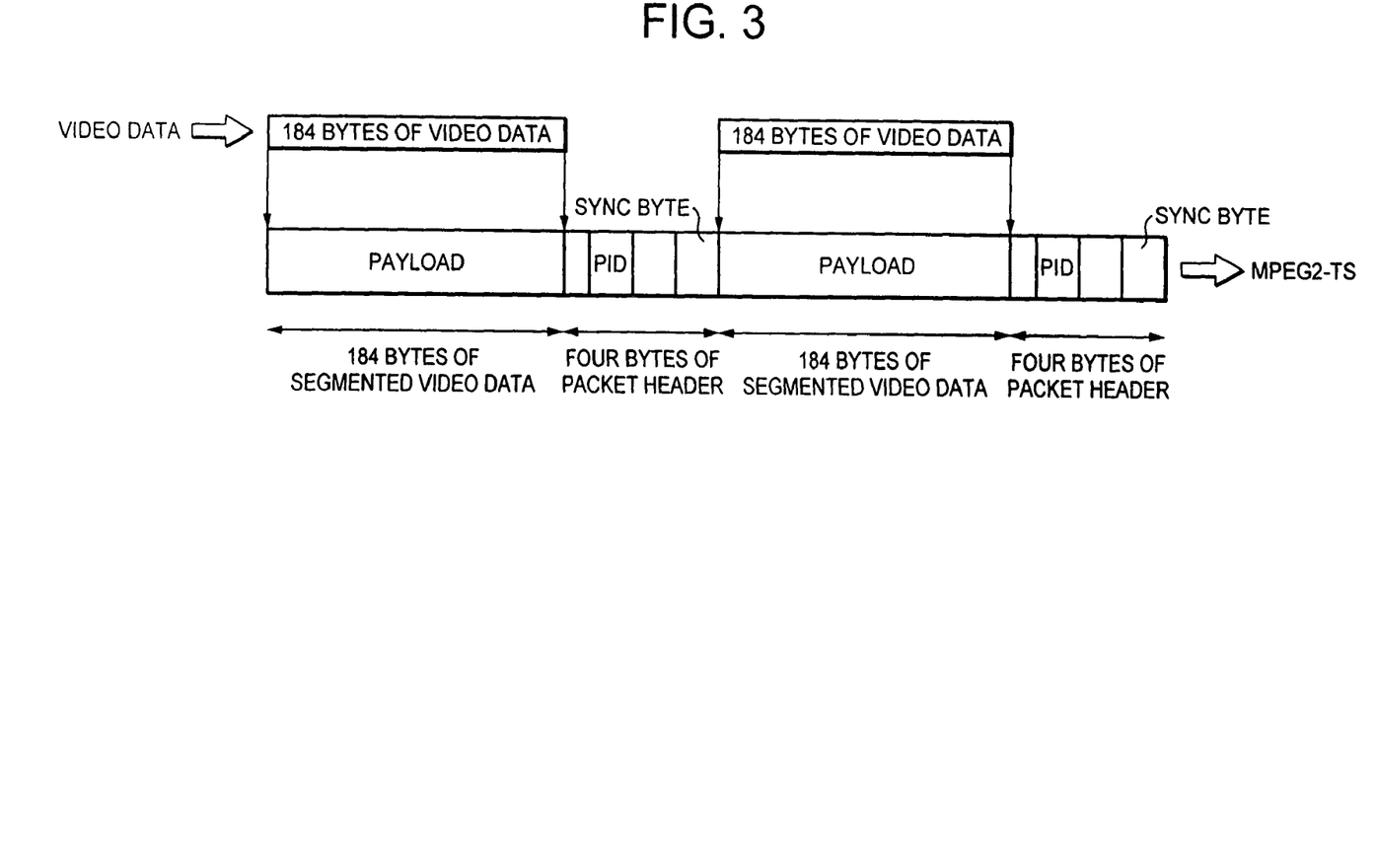
FIG. 3 It is a diagram for explaining an example of a format conversion method for video data output from a video decoder shown in FIG. 1.

As is apparent from the above description, the video data may be transferred to the system memory 2 using the demultiplexer 18 merely by inserting the four bytes of packet header between 184-byte video data in a manner shown in FIG. 3. The format conversion circuit 100 is to perform such a format conversion, and in order to omit the necessity of providing the frame buffer memory 31 required in the conventional capture circuit 3 shown in FIG. 11, it needs to meet the following two conditions:

(1) It must perform the format conversion in real time.
(2) It must synchronize a sampling clock for incoming video data VD with a sampling clock for outgoing MPEG2-TS data MD.

As shown in FIG. 3, the video data VD has to be segmented into 184-byte packet units while inserting a packet header between the packet units. In order to meet the above condition (1), it can be considered to process 188 bytes of MPEG2-TS data MD during the period of receiving 184 bytes of video data VD in a manner shown in FIG. 4. In this case, it is needed that the transfer rate of incoming video data VD and the transfer rate of outgoing MPEG2-TS data MD establish the following equation relationship.

Transfer Rate of MPEG2-TS Data=188/184×Transfer Rate of Video Data

Figure 4:
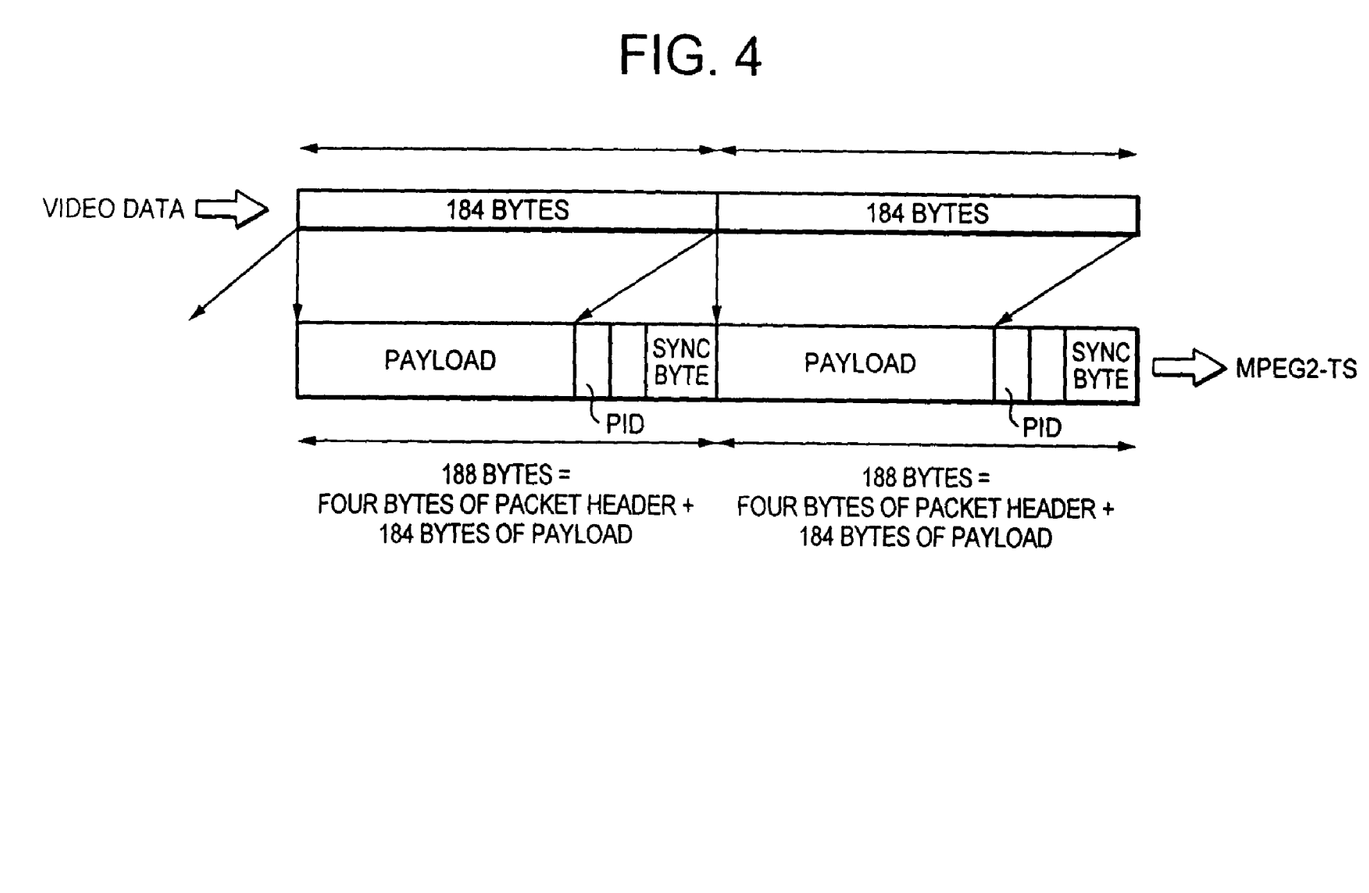
FIG. 4 It is a diagram for explaining another example of the format conversion method.

In this method, however, the MPEG2-TS data MD needs to be transferred at a speed about 1.02 times higher than the video data VD, and this makes it impossible to transfer the MPEG2-TS data MD in synchronization with the sampling block for video data VD. Therefore, this method does not meet the above condition (2).

Figure 5:
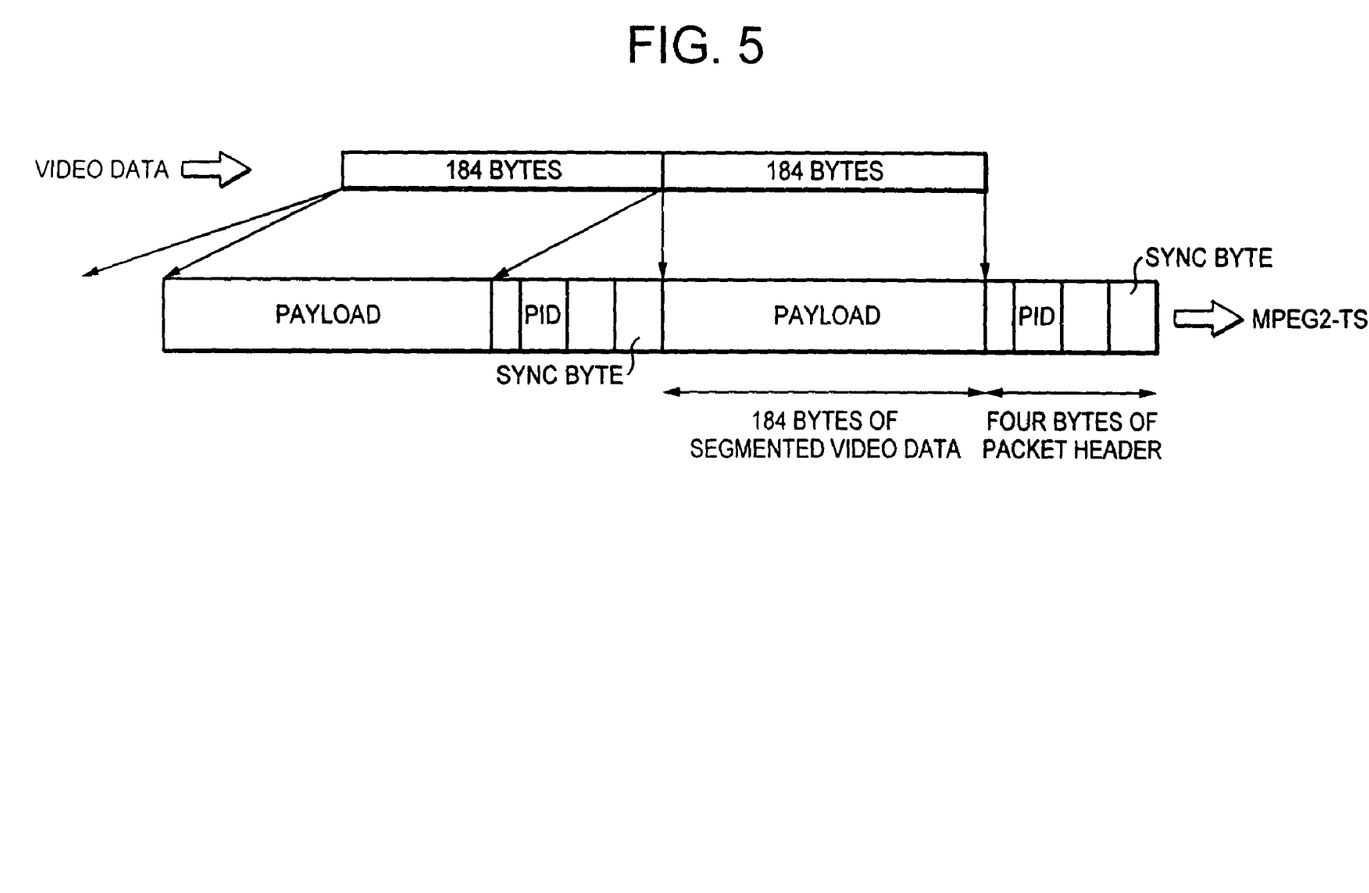
FIG. 5 It is a diagram for explaining a format conversion method through the format conversion circuit shown in FIG. 1.

It can also be considered to process and transfer the incoming video data VD and the outgoing MPEG2-TS data MD in synchronization with an identical sampling clock in a manner shown in FIG. 5. In this method, however, the transfer of the MPEG2-TS data MD is delayed by an amount of time corresponding to four bytes of packet header each time the 184-byte data packet is transferred. Therefore, this method cannot be simply adopted to meet the above condition (1). The format conversion circuit 100 according to the invention is configured to meet the above condition (1) using this latter method. The following explains the configuration.

Figure 6:
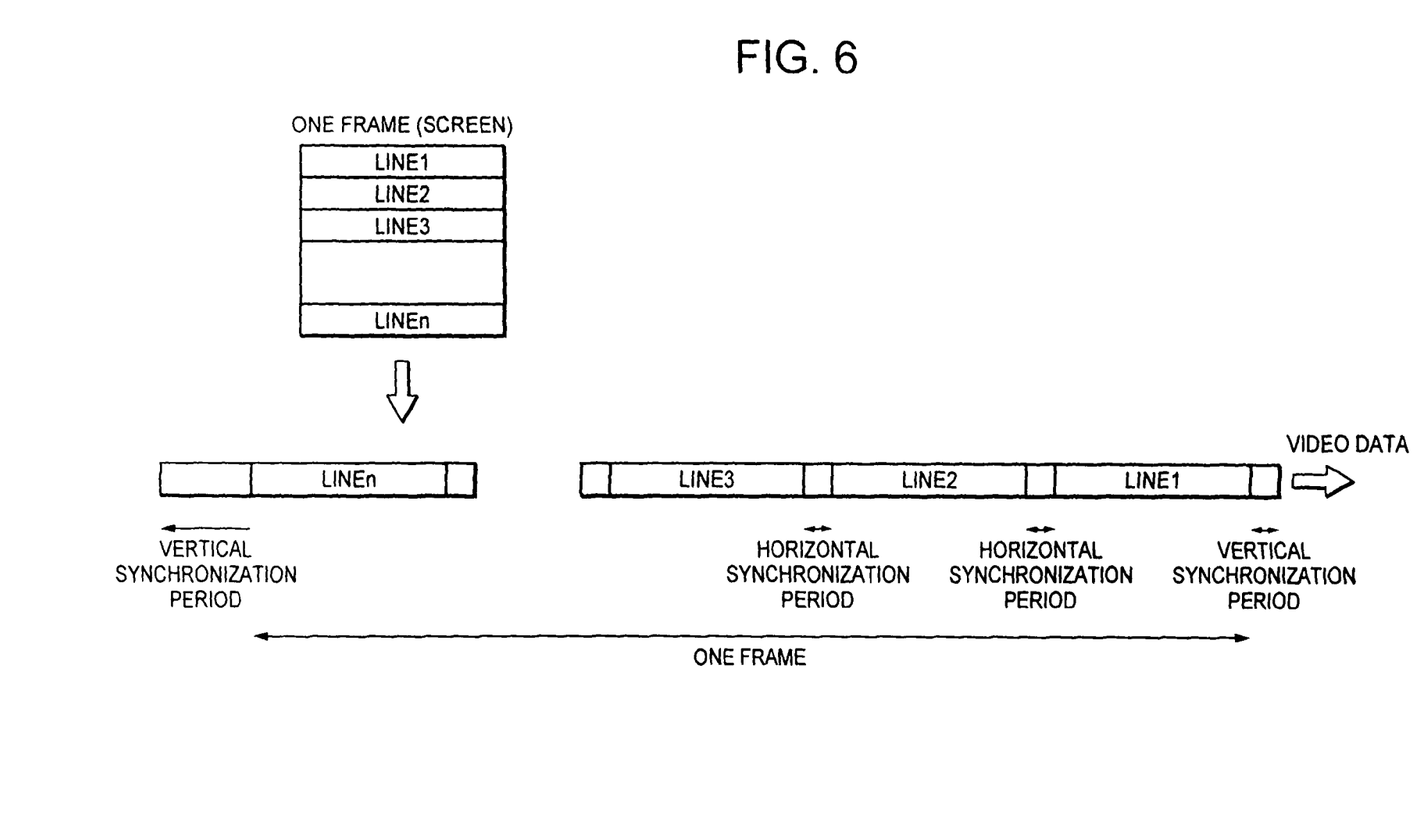
FIG. 6 It is a diagram showing the frame structure of video data output from the video decoder shown in FIG. 1.

FIG. 6 shows the frame structure of video data VD. As is apparent from FIG. 6 that one frame is composed of n lines. The lines are aligned one after another to form video data VD. The video data VD contains two kinds of synchronization periods during which no valid video data exists. One is a horizontal synchronization period and the other is a vertical synchronization period. The horizontal synchronization period exists between lines, while the vertical synchronization period exists between frames.

Although the method shown in FIG. 5 causes the format conversion to the pseudo MPEG2-TS format to be delayed by an amount of time at which a packet header is inserted, the format conversion circuit 100 according to the embodiment of the invention absorbs the delays using the horizontal synchronization periods that exist in the video data VD. A method for absorbing the delays is shown in FIG. 7.

Figure 7:
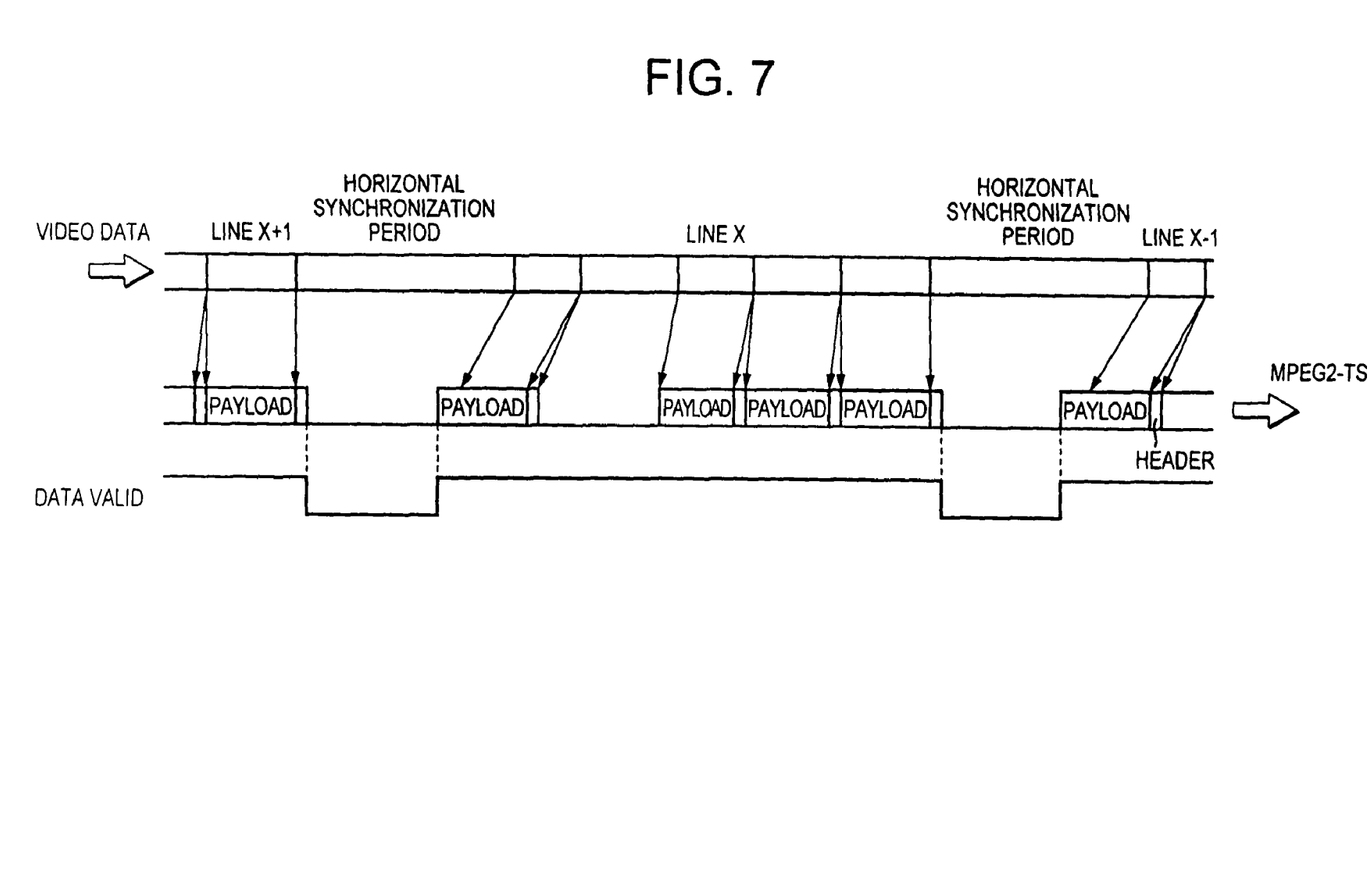
FIG. 7 It is a diagram for explaining the whole story on the format conversion method through the format conversion circuit shown in FIG. 1.

As shown in FIG. 7, the input video data is segmented into multiple segments that become payloads of MPEG2-TS data MD to be output. A packet header as defined by MPEG2-TS is inserted immediately before each payload. In the example of FIG. 7, a payload is still in process of being transferred after completion of the transfer of valid data of line X. The transfer of this payload, however, is completed during the horizontal synchronization period that follows the line X. After completion of the horizontal synchronization period, when the transfer of valid data of line X+1 is started, the transfer of the next payload is started. If one line of data is segmented into 188-byte payloads, fractional data less than 188 bytes may occur. In this case, dummy data may be added to the fractional data to make a 188-byte payload. When this method is used to convert the format of video data VD to the pseudo MPEG2-TS format, a blank period in which no valid data exists in each horizontal synchronization period. Such a blank period also occurs in each vertical synchronization period. The format conversion circuit 100 according to the invention is configured to generate a data valid signal that indicates the existence of valid data in all but blank periods.

Figure 8:
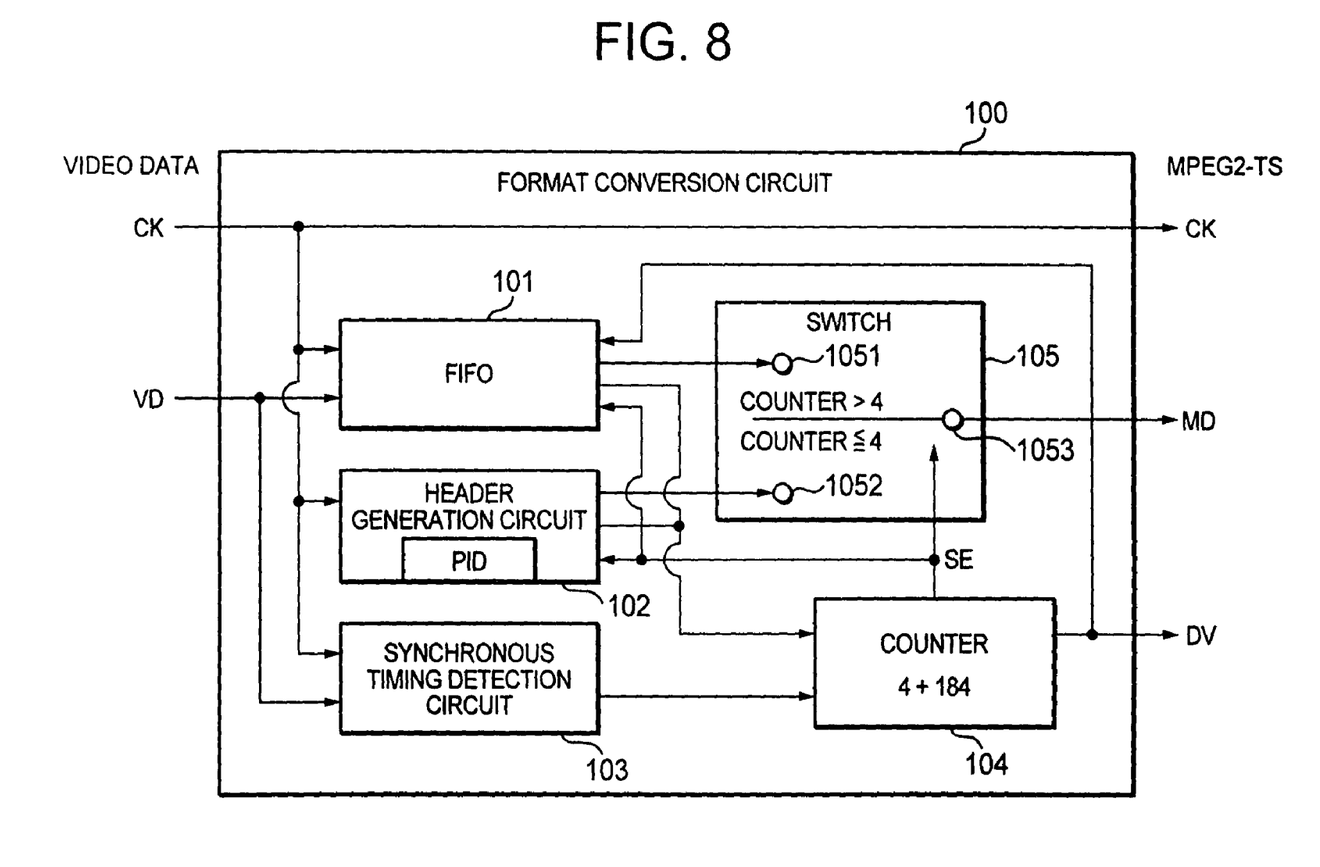
FIG. 8 It is a functional block diagram showing the structure of the format conversion circuit shown in FIG. 1.

FIG. 8 shows the details of the format conversion circuit 100 that implements such an operation. As shown in FIG. 8, the format conversion circuit 100 includes a FIFO (First-In First-Out) memory 101, a header generation circuit 102, a synchronous timing detection circuit 103, a counter 104, and a switch 105. Video data VD and a sampling clock CK are input into the format conversion circuit 100. If the video data VD is data in the format specified by ITUR-BT.656, control signals such as horizontal and vertical synchronizing signals will be embedded in the video data VD. If they are not embedded in the video data VD, the control signals will be input in conjunction with the video data VD. The format conversion circuit 100 outputs MPEG2-TS data MD. It also outputs the sampling clock CK for the video data VD as it is as the sampling clock CK for the MPEG2-TS data MD. Further, the format conversion circuit 100 outputs a data valid signal DV that indicates the validity of the MPEG2-TS data MD.

The FIFO memory 101 stores the video data VD in response to the sampling clock CK for the video data VD. In other words, the FIFO memory 101 is synchronized with the sampling clock CK for the video data VD to write and read the video data VD. The FIFO memory 101 is reset to erase the video data VD when the data valid signal DV from the counter 104 is activated.

The header generation circuit 102 generates an MPEG2-TS packet header in response to the sampling clock CK for the video data VD. Each packet header includes the PID and sync byte as specified by MPEG2-TS.

The synchronous timing detection circuit 103 detects the horizontal synchronizing signal for the video data VD in response to the sampling clock CK for the video data VD, and notifies it to the counter 104 and FIFO memory 101.

The counter 104 is reset in response to the horizontal synchronizing signal detected by the synchronous timing detection circuit 103 so that the counter 104 will count the number of bytes of packet header output from the header generation circuit 102 and the number of bytes of video data VD read out of the FIFO memory 101.

The switch 105 selects the packet header generated by the header generation circuit 102 until the number of bytes of packet header counted by the counter 104 reaches the number of bytes of packet header as specified by MPEG2-TS (Specifically four bytes). After the number of bytes counted by the counter 104 reaches the number of bytes of packet header as specified by MPEG2-TS (Specifically four bytes), the switch 105 selects the video data read out of the FIFO memory 101. Specifically the switch 105 has two input terminals 1051 and 1052, and an output terminal 1053. The input terminal 1051 receives the video data from the FIFO memory 101. The input terminal 1052 receives the packet header from the header generation circuit 102. The switch 105 is changed in response to a select signal SE output from the counter 104. To be specific, the output terminal 1053 is connected to the input terminal 1052 when the count value of the counter 104 is "4" or less, while it is connected to the input terminal 1051 when the count value of the counter 104 exceeds "4."

Referring next to timing charts of FIGS. 9 and 10, the operation of the format conversion circuit 100 thus configured will be described.

Figure 9:
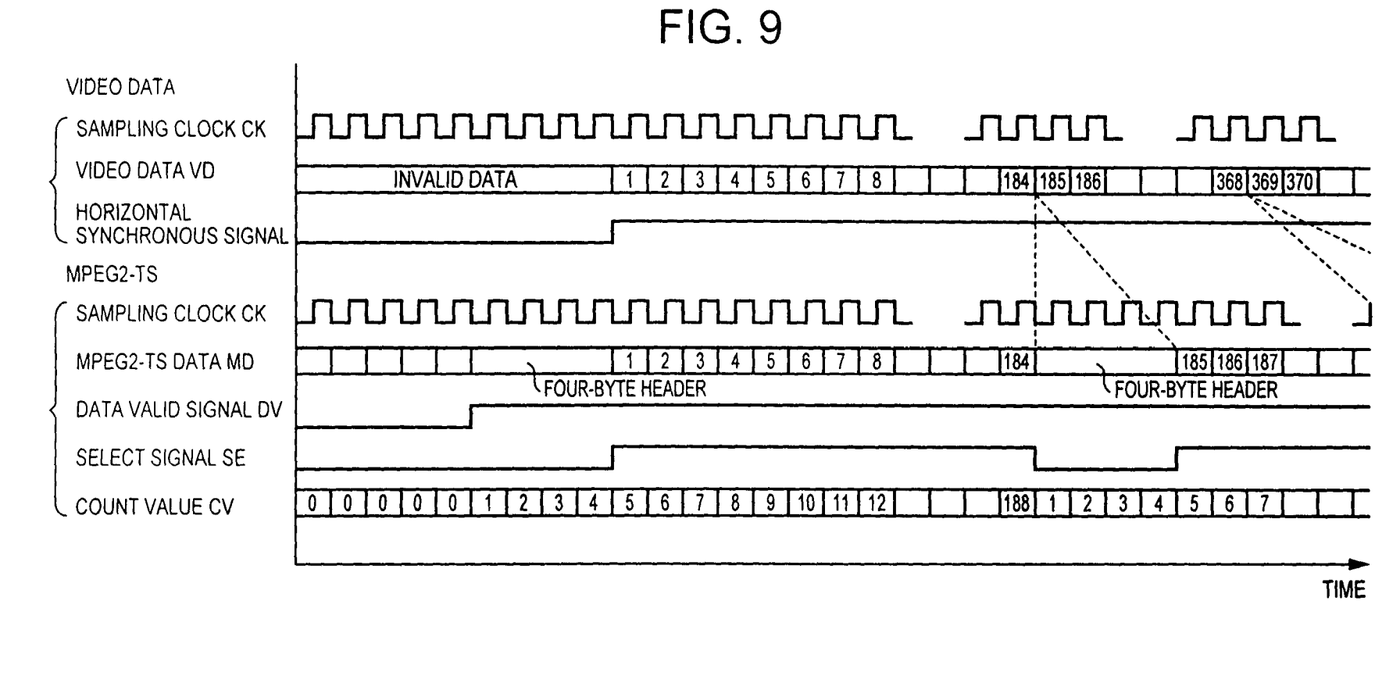
FIG. 9 It is a timing chart showing the operation of the format conversion circuit shown in FIG. 8.
Figure 10:
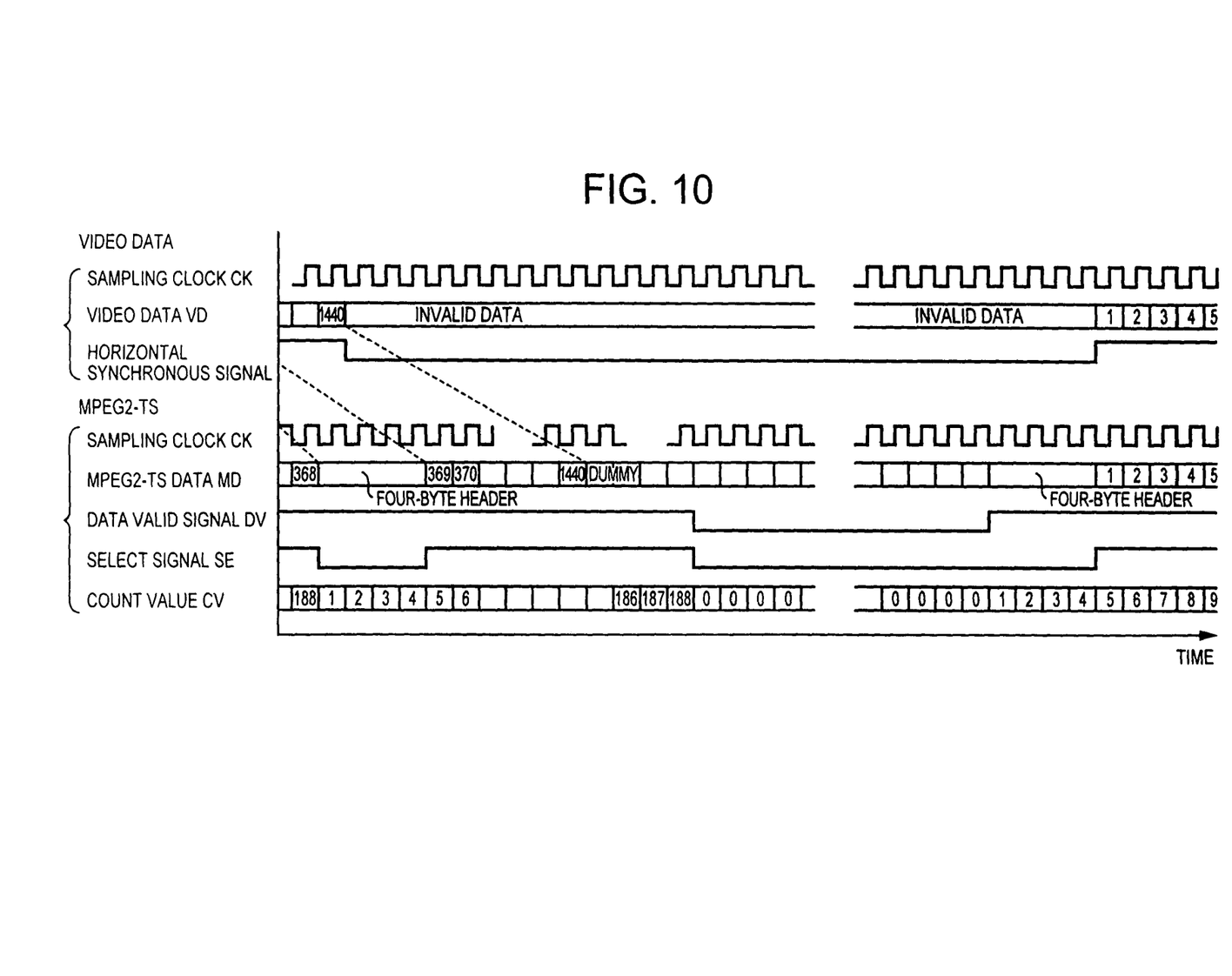
FIG. 10 It is a timing chart continued from FIG. 9.

As shown in FIGS. 9 and 10, the video data VD is written into the FIFO memory 101 in synchronization with the sampling clock CK for the video data VD. To be specific, a byte of video data VD is written into the FIFO memory 101 in each clock cycle of the sampling clock CK. In the embodiment, 1440 bytes of valid video data VD are input within one horizontal period (interval between a horizontal synchronization period and the next synchronization period). Invalid (or meaningless) data is input within each horizontal synchronization period. A horizontal synchronizing signal HS is activated to an L (logical low) level during the horizontal synchronization period, and deactivated to an H (logical high) level during the horizontal period. Although in FIGS. 9 and 10 the horizontal synchronizing signal HS is shown separately from the video data VD, if the video data VD is data in the format specified by ITUR-BT.656, the horizontal synchronizing signal HS is embedded in the video data VD. Therefore, in this case, the horizontal synchronizing signal HS is extracted from the video data VD.

Since the select signal SE is at the L level during the horizontal synchronization period in which the horizontal synchronizing signal HS is deactivated to the L level, the switch 105 selects the four-byte packet header from the header generation circuit 102 to output the same as MPEG2-TS data MD. Since the counter 104 counts the number of bytes of this packet header, it takes count values CV from "0" to "4." When the count value becomes a value other than "0," the counter 104 activates the data valid signal DV to the H level.

Upon completion of the horizontal synchronization period, the video data VD is sequentially written into the FIFO memory 101, and read out immediately. When the count value exceeds "4" and becomes "5," the counter 104 changes the select signal SE to the H level. This changes the switch 105 to select the video data read out of the FIFO memory 101 immediately behind the four-byte packet header. The selected vide data is output as a payload of MPEG2-TS data MD.

The counter 104 counts the number of bytes of the video data read out of the FIFO memory 101 immediately after counting that of the packet header. When the counter 104 counts up to the 184-th byte of the video data, the count value reaches "188." Since up to this time the format conversion circuit 100 has output 184 bytes of video data as the payload of MPEG2-TS data MD, the counter 104 changes the select signal SE to the L level to change the switch 105 to select again the packet header output from the header generation circuit 102.

The above-mentioned sequence of operations is repeated from then on. It should be noted that although the first 184 bytes of video data VD are output as MPEG2-TS data MD in real time, the second or further 184-byte video data VD is output with a delay for the packet header inserted immediately before it. For example, the second 184 bytes of video data VD (185-368) is delayed by an amount of time corresponding to four bytes, the third 184 bytes of video data VD (369-552) is delayed for eight bytes (four bytes times 2), and the last (seventh) 184 bytes of video data VD (1288-1440) is delayed for 28 bytes (four bytes times 7).

In the embodiment, since the video data VD is 1440 bytes, if it is divided into 184-byte payloads, the last payload is only 152 bytes (the remainder of 1440 divided by 184). Therefore, 32 bytes (=152 subtracted from 184) of dummy data are added to the last payload. Although the dummy data could be of any type, dummy data arbitrarily read out of the FIFO memory 101 is assumed here. The counter 104 counts the number of bytes of dummy data as continued from the valid data, and when the count value CV reaches "188," the select signal SE is changed to the L level and the data valid signal DV is deactivated to the L level.

The next line of video data VD is processed in the same manner. Upon starting the format conversion of the next line of video data VD, the counter 104 activates again the data valid signal DV to the H level. The FIFO memory 101 is reset in response to this H-level data valid signal DV to erase the previous line of video data VD.

As discussed above, it is necessary in the embodiment to keep in the FIFO memory 101 the video data VD input while four bytes of packet header are being inserted. The necessary capacity of the FIFO memory 101 is generally expressed by the following equation.

FIFO Size={(Number of Bytes for One Line of Video Data/184)−A}×Number of Bytes of Packet Header In this equation, A=0 when the number of bytes for one line of video data cannot be divided by 184, or A=1 when the number of bytes for one line of video data can be divided by 184.

In the embodiment, since the number of bytes for one line of video data is 1440 bytes, and the number of bytes of packet header is four bytes, A=0 and the capacity necessary for the FIFO memory 101 is determined as 28 bytes from the following equation.

FIFO Size={(1440/184)−0}×4=28 (bytes)

Thus the embodiment can enormously reduce the capacity necessary for the FIFO memory 101 compared to that necessary for the conventional frame buffer memory 31. To be specific, in the case of NTSC, the amount of valid data is 1440 bytes per line and 485 lines exist in one frame. In this case, the amount of data per one frame is 698400 bytes (=1440 bytes times 485 lines). Therefore, the conventional frame buffer memory 31 needs a capacity of 698400 bytes, whereas the FIFO memory 101 in the embodiment needs only a capacity of 28 bytes.

As described above, according to the embodiment, the format conversion circuit 100 converts the format of video data VD to the pseudo MPEG2-TS format. Therefore, when the format-converted MPEG2-TS data MD is input to the digital broadcast receiver system chip 1, through the MPEG2-TS input port, the demultiplexer 18 processes the input MPEG2-TS data MD in the same manner as it processes normal MPEG2-TS data. As a result, the captured video data VD can be transferred to the system memory 2 without going through the capture circuit 3 required in the conventional systems. Further, the formal conversion circuit 100 is synchronized with the sampling clock CK for the video data VD to write and read the video data into and from the FIFO memory 101, and output the sampling clock CK for the video data VD as it is as the sampling clock CK for the MPEG2-TS data MD. Therefore, the MPEG2-TS data MD can be synchronized with the video data VD. In addition, the format conversion circuit 100 absorbs, in the horizontal synchronization periods, the delays of processing the video data VD due to the insertion of the packet headers, thereby performing the format conversion in real time.

The above-mentioned embodiment is just an example for carrying out the invention. Therefore, the invention is not limited to the above-mentioned embodiment, and appropriate modifications can be carried out without departing from the spirit and scope of the invention as set forth in the appended claims.

The invention claimed is:

1. A format conversion circuit for converting the format of digitized video data comprising a plurality of lines of data with a plurality of horizontal synchronization periods, one horizontal synchronizing period following each line of data, to a pseudo MPEG2-TS format, comprising:
    a FIFO memory for storing the video data in response to a clock for the video data;
    a header generation circuit for generating an MPEG2-TS packet header in response to the clock for the video data;
    a synchronous timing detection circuit for detecting a horizontal synchronizing signal for the video data said horizontal synchronizing signal indicating the end of a horizontal synchronizing period for a preceding line of data and the start of a next successive line of data;
    a counter, reset in response to the horizontal synchronizing signal detected by said synchronous timing detection circuit, for counting the number of bytes of packet header output from said header generation circuit and the number of bytes of video data read out of said FIFO memory; and
    a switch, which selects the packet header generated by said header generation circuit until the number of bytes counted by said counter reaches the number of bytes of packet header as specified by MPEG2-TS, and selects the video data read out of said FIFO memory after the number of bytes counted by said counter has reached the number of bytes of packet header as specified by MPEG2-TS,
    whereby the switch alternately selects the packet header and the video data for successive packets until all video data for a line has been packetized and whereby, for each line of data, the selecting of video data is completed during the horizontal synchronizing period following that line of data, wherein said counter outputs a data valid signal that indicates the validity of the data, the format of which has been converted to the pseudo MPEG2-TS format, while counting the number of bytes of packet header and the number of bytes of video data.

2. A format conversion circuit according to claim 1, wherein said FIFO memory is reset in response to the data valid signal output from said counter to erase the video data stored.

* * * * *